Nov. 24, 1925.  W. A. RARIG  1,562,788
OILER FOR TRANSMISSION BANDS
Filed April 24, 1923

INVENTOR
WALTER A. RARIG
BY
Harry C. Schroder
ATTORNEY

Patented Nov. 24, 1925.

1,562,788

UNITED STATES PATENT OFFICE.

WALTER A. RARIG, OF OAKLAND, CALIFORNIA.

OILER FOR TRANSMISSION BANDS.

Application filed April 24, 1923. Serial No. 634,323.

*To all whom it may concern:*

Be it known that I, WALTER A. RARIG, a citizen of the United States, residing at Oakland, in the county of Alameda and State of California, have invented certain new and useful Improvements in Oilers for Transmission Bands, of which the following is a specification.

My invention is an improved oiler for the transmission bands of automobiles, and is particularly applicable to Ford cars.

When the oil level is low in the crank case and when descending hills, the transmission bands receive very little oil, which causes them to burn and to operate badly.

The object of my invention is to provide an oiler which will collect the oil thrown by centrifugal force from the flywheel and distribute it to the transmission band, brake bands, and clutch throw-out collar.

Another object of my invention is to provide an oiler which is simple in construction, inexpensive to manufacture, efficient in operation and is easily installed.

In the annexed drawing in which my invention is illustrated:

Figure 1:
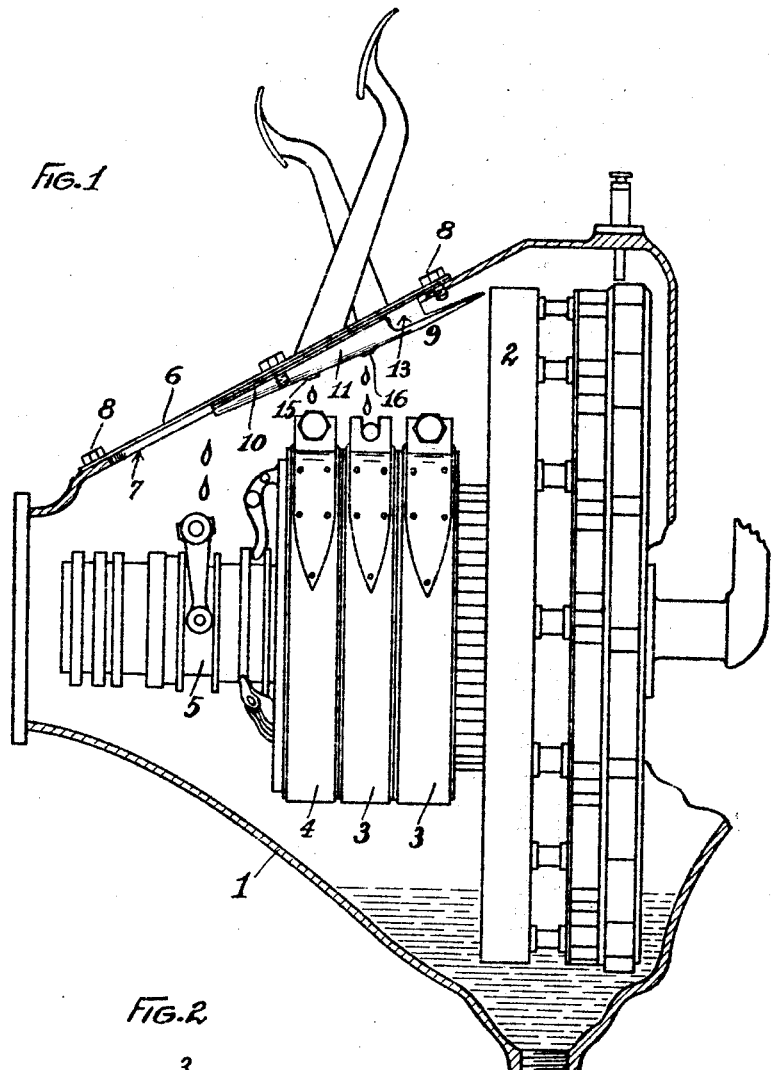
Figure 1 is a transverse sectional view of a transmission housing with my oiler in position therein.
Figure 2:
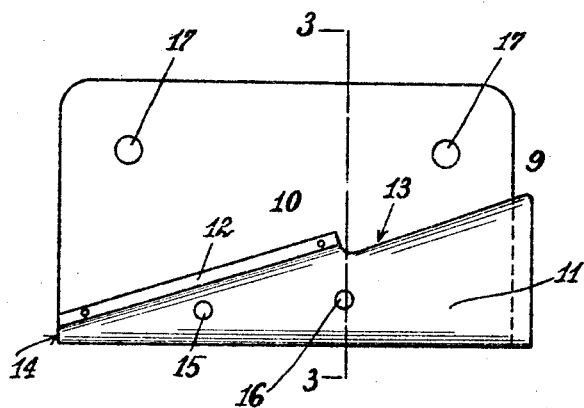
Figure 2 is a bottom view of my oiler.
Figure 3:
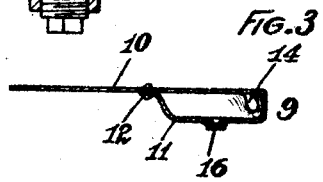
Figure 3 is a sectional view taken on line 3—3 of Figure 2.

Referring more particularly to the drawing, the numeral 1 indicates a housing in which are positioned the flywheel 2, transmission bands 3—3, brake band 4 and the clutch collar 5. An inspection plate 6 covers an opening 7 in the housing 1 and is secured in position by means of cap screws 8.

My oiler 9 is formed of a single piece of metal, and consists of a straight upper securing plate 10 and an oil conveyer 11. The conveyer 11 is formed by bending the metal downward and inward, and riveting the edge 12 in position to form a hollow tapered opening through which the oil flows. The edge 12 is not secured throughout its entire length but the forward part is cut away as at 13 which permits the oil to be thrown into the upper end of the conveyer. A hole 14 is left at the constructed end of the conveyer 11 which drips oil upon the clutch collar 5. Holes 15 and 16 are formed in the bottom of the conveyer 11 which drip oil upon the brake band 4 and transmission band 3 respectively. The metal is allowed to depend around the holes 15 and 16 which prevents the oil running along the bottom of the conveyor 11 and away from the bands 3 and 4.

My oiler is secured to the housing 1 by means of two of the screws 8 which pass through holes 17 in the plate 10. The outer edge of the plate 10 rests upon the housing 1 and the conveyer 11 is positioned within the hole 7 and adjacent the flywheel 2; the bolts 8 are now passed through the cover plate 6 and plate 10 into the housing 1, thus securing the oiler in position.

The oil is thrown from the fly wheel 2 through the opening 13 with considerable force, and consequently a large amount of oil flows through the conduit 11, through the openings 14, 15 and 16, into the transmission.

It will be noted, referring to Figure 1, that opening 13 at its upper end extends clear across the oiler with the back wall continuing further towards the fly wheel 2 than the front wall so that some of the oil caught on the lower plate is forced through the back opening onto the first that is the reverse, transmission band 3. The back wall functions to catch most of the oil thrown clear of the flywheel and conduct it into the conduit 11.

Having described my invention, I claim:

1. An oiler adapted to be positioned in the transmission housing and bolted to one side only of an opening thereinto adjacent the flywheel of an engine comprising a plate bent upon itself to form a tapered conveyor, the front wall of the bent portion being cut away to a greater extent than the back wall whereby the back wall acts as a positive oil catch, said conveyor terminating in an end opening adapted to drip oil on the clutch collar and having spaced openings in the bottom to drip oil on the transmission bands.

2. An oiler adapted to be positioned in the transmission housing and adjacent the flywheel of an engine comprising a plate bent upon itself to form a tapered oil conveyor, said bent portion being cut away near one end to form an oil receiving opening and being riveted to the unbent portion adjacent the other end.

3. An oiler adapted to be positioned in the transmission housing and bolted to one side only of an opening thereinto adjacent the flywheel of an engine, comprising a top plate bent upon itself downwardly to form a back wall, a bottom wall and a front wall, the upper edge of the front wall being riveted to the top wall to form a tapered oil conveyor, an opening in the lower end of the conveyor formed at the edge of the plate, oil openings in the bottom wall, the top and bottom walls extending lengthwise about the same distance and the front wall being cut away more than the back wall whereby the back wall is adapted to catch oil thrown by the flywheel and adapted to conduct it into the conveyor.

In testimony whereof I affix my signature.

WALTER A. RARIG.